Figure 1:
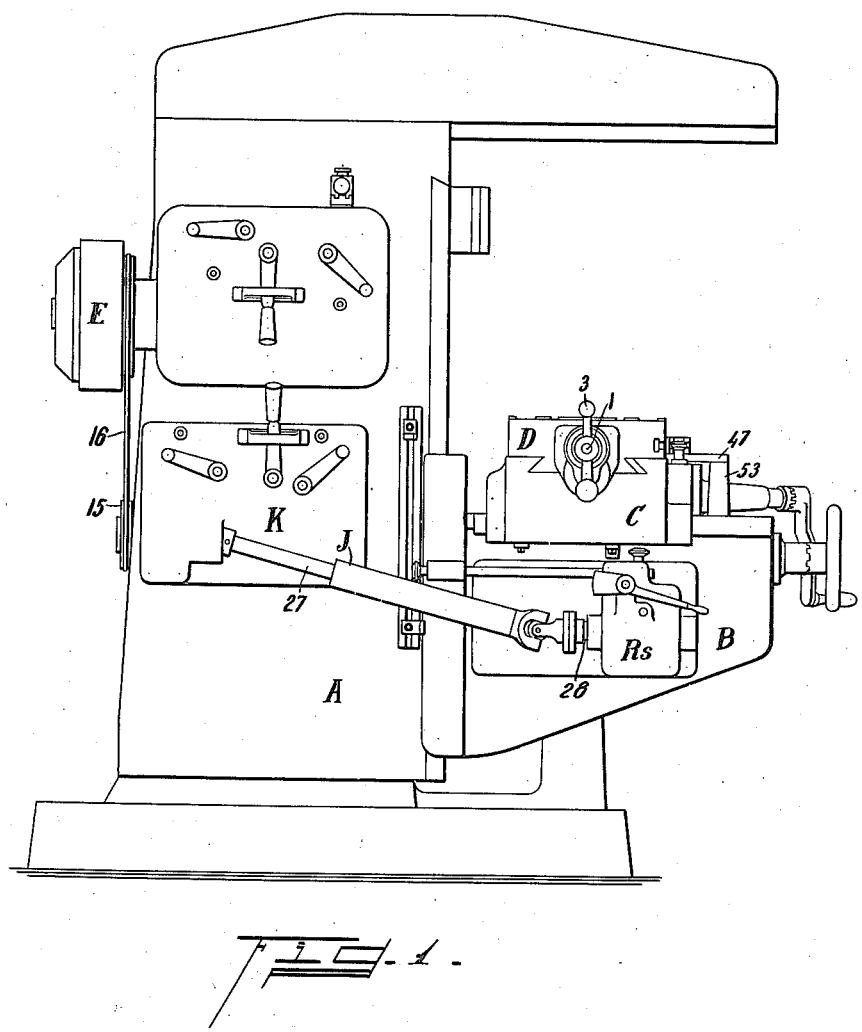

S. EINSTEIN.
AUTOMATIC FEED, QUICK TRAVERSE, AND REVERSE CONTROL.
APPLICATION FILED JUNE 10, 1913.

1,092,479.

Patented Apr. 7, 1914.
5 SHEETS—SHEET 1.

S. EINSTEIN.
AUTOMATIC FEED, QUICK TRAVERSE, AND REVERSE CONTROL.
APPLICATION FILED JUNE 10, 1913.

1,092,479.

Patented Apr. 7, 1914.

5 SHEETS—SHEET 2.

Witnesses

Inventor
Sol Einstein
By Wood Wood & Nathan
Attorneys

S. EINSTEIN.
AUTOMATIC FEED, QUICK TRAVERSE, AND REVERSE CONTROL.
APPLICATION FILED JUNE 10, 1913.

1,092,479.

Patented Apr. 7, 1914.
6 SHEETS—SHEET 3.

Witnesses

Inventor
Sol Einstein
By Wood Wood & Nathan
Attorneys

S. EINSTEIN.
AUTOMATIC FEED, QUICK TRAVERSE, AND REVERSE CONTROL.
APPLICATION FILED JUNE 10, 1913.
1,092,479.
Patented Apr. 7, 1914.
5 SHEETS—SHEET 4.
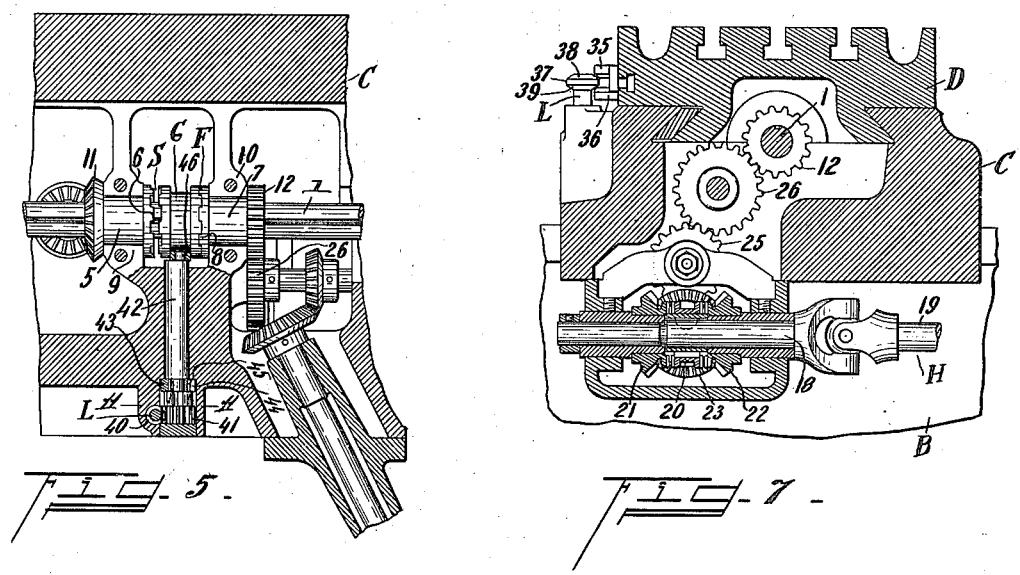
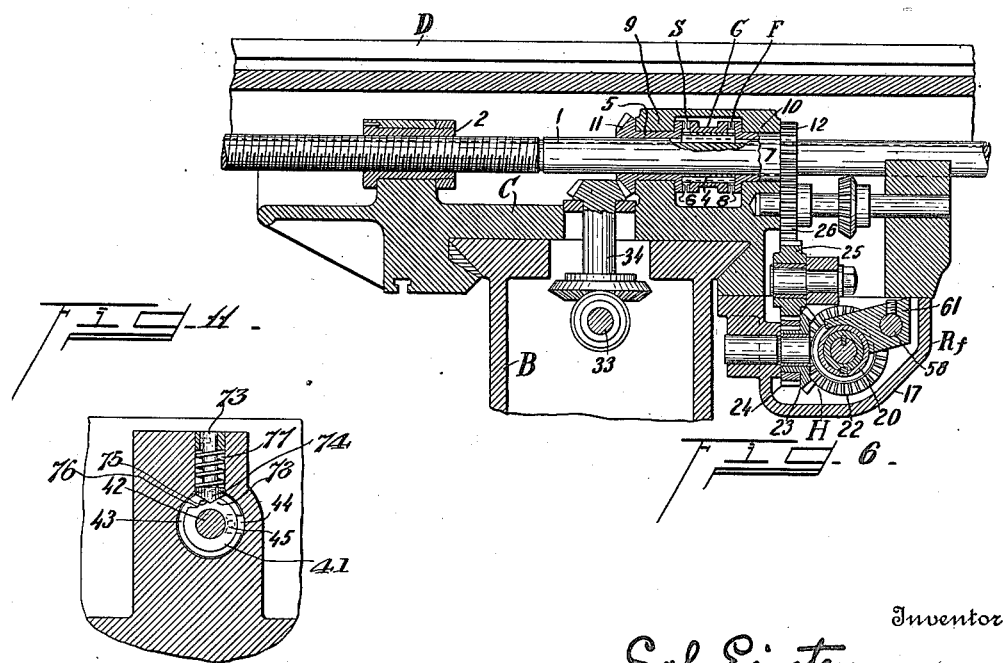
Witnesses
C. B. Hosted
Emma Spener
Inventor
Sol Einstein
By Wood Wood & Nathan
Attorneys

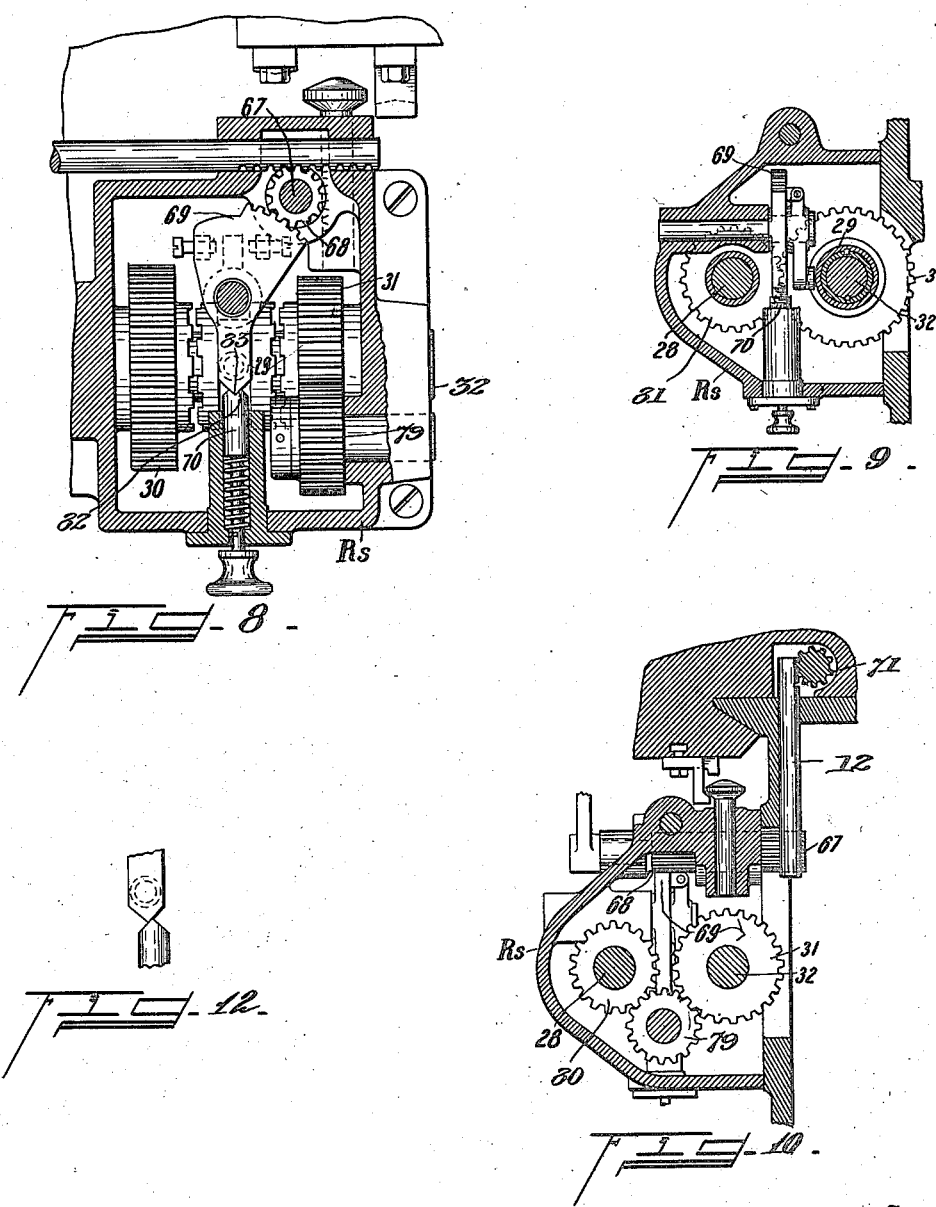

UNITED STATES PATENT OFFICE.

SOL EINSTEIN, OF CINCINNATI, OHIO, ASSIGNOR TO THE CINCINNATI MILLING MACHINE COMPANY, OF OAKLEY, CINCINNATI, OHIO, A CORPORATION OF OHIO.

AUTOMATIC FEED, QUICK-TRAVERSE, AND REVERSE CONTROL.

1,092,479.  Specification of Letters Patent.  Patented Apr. 7, 1914.

Application filed June 10, 1913. Serial No. 772,792.

*To all whom it may concern:*

Be it known that I, SOL EINSTEIN, a subject of the German Emperor, and residing at Cincinnati, in the county of Hamilton and State of Ohio, have invented a new and Improved Automatic Feed, Quick-Traverse, and Reverse Control, of which the following specification is a full disclosure.

This invention relates to milling machines and it deals with an automatic mechanism for alternating a feed of the table by a quick traverse thereof in any relation desired by the operator.

One object within the contemplation of this invention is to create a new combination constituting a table propelling mechanism in which many elements heretofore employed may be utilized in addition with certain new features whereby the capacity of the mechanism may be greatly enhanced both with respect to provide new modes of operation and an ability to perform the same automatically.

Another object is to render available a very simple mechanism whereby the table of a machine tool under the control of dogs adjustable on the table may be caused first to feed for a given interval, then make a quick traverse for another given interval, then again feed for a further interval, and so on alternately, as often as desired, and also to enable an automatic reverse or stop to take place at any desired time.

Another object is to devise a feed and quick traverse control of such a character that existing milling machines of various makes and descriptions may by slight additions or changes be converted into an embodiment of this invention, giving such machines the automatic capacity for alternating feeding and quick-traversing motions of the table and enabling reversals or stops to be automatically effected.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 2:
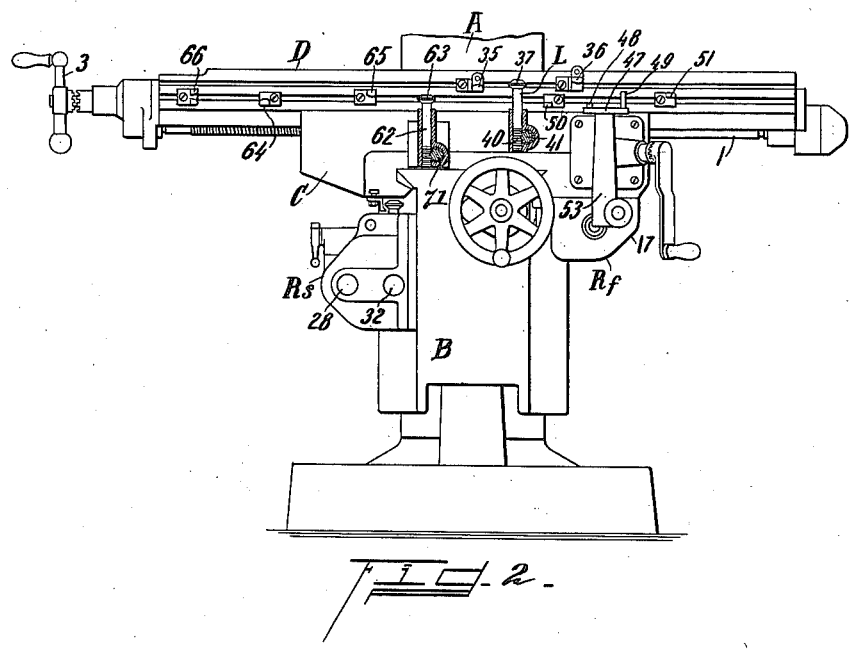
Figure 4:
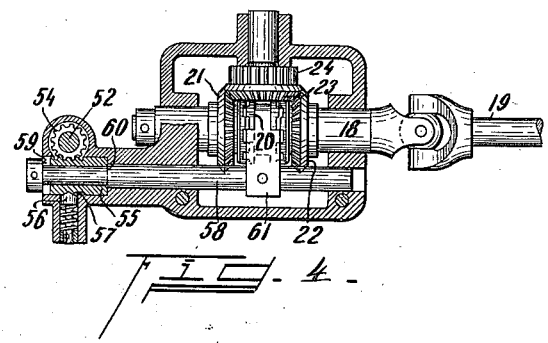
Figure 3:
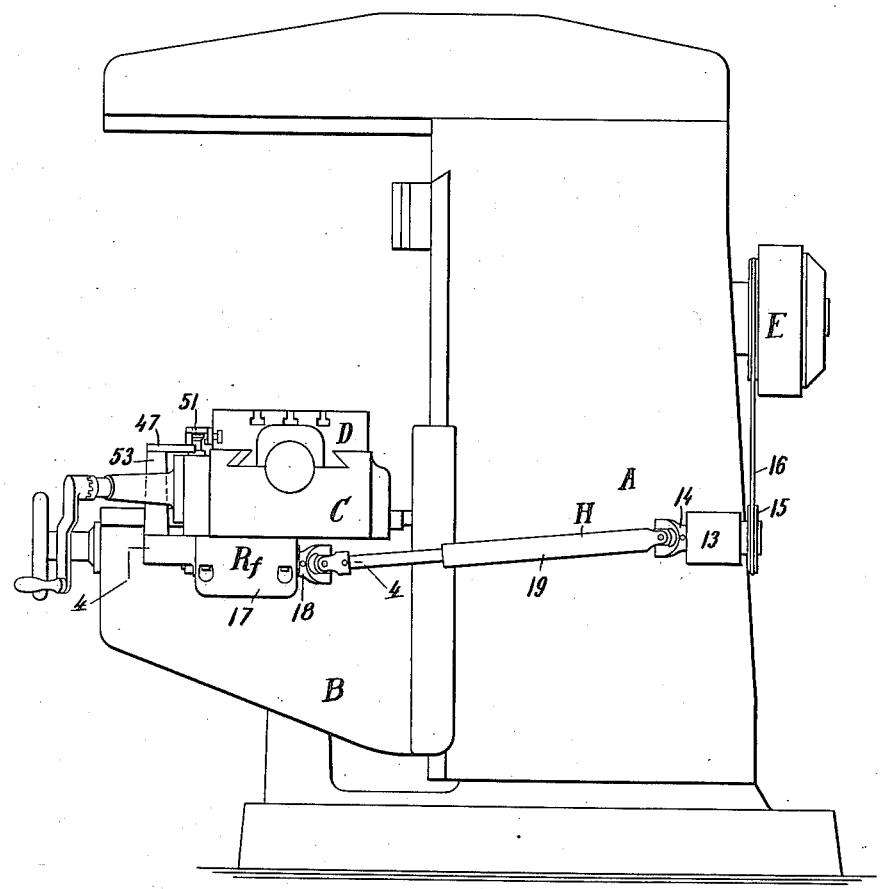

Figure 1 is a side elevation of a milling machine embodying this invention. Fig. 2 is an end elevation of the same showing the table with the dogs and the trip plungers contemplated hereby. Fig. 3 is a side elevation of the milling machine looking in the opposite direction from that presented by Fig. 1. Fig. 4 is a section through line 4—4 of Fig. 3. Figs. 5, 6, 7 and 11 detail the fast or slow driving arrangement for the feed-screw, as well as the fast-reverse, and Figs. 8, 9, 10 and 12 detail the slow-reverse.

Continuing now by way of a more detailed description it may be stated at the outset that this invention contemplates a reciprocating milling machine table on which are adjustably mounted a plurality of stops or dogs which coöperate with a plurality of elements mounted in the path of travel of said dogs, and one of which has the function when actuated of changing the rate of travel of the table from a "feed" to a "quick traverse," or conversely, and another of which has the capacity of reversing the direction of travel of the table, causing the cutter to return either slowly over the work so as to refinish the same or rapidly to reach the starting point without loss of time. Before detailing the specific features of construction whereby these functions are attained, it will be convenient first to describe certain major elements of a milling machine.

The major milling machine elements comprise a column A, a vertically movable knee B, together with screws for elevating and lowering it, a saddle C, together with means for adjusting it on the knee toward or away from the column A, and a table D which supports the work and which is fed right and left on the saddle C by power derived from a prime mover E, which is here illustrated as a pulley journaled in the frame A, and which is suitably driven, as by means of a motor or counter-shaft. It will be understood that by prime mover I contemplate any selected power driven element, its location and form being immaterial, within the aspect of this invention; thus, prime mover may refer to a motor located in or adjacent the machine, a counter-shaft located adjacent the same, or some element within the machine.

The table-propelling feed screw is indicated by 1, and it is journaled at its ends in the table so as to translate as a unit therewith, and it passes through a fixed nut 2 which is mounted on the saddle, and receives the threads of the feed screw so that by rotating the feed screw it will be translated axially and effect a corresponding movement of the table. This feed screw preferably projects from one end of the table and provides a handle 3 whereby it may be manually operated. By the construction proposed by this invention, this feed screw is rotated by power derived from the prime mover rapidly so as to effect a quick traverse of the table, or slowly so as to effect a "feed" of the table, as well as rotated in reverse directions so as to effect an advance or return stroke of the table by power derived from the prime mover. This is accomplished by providing two branch line transmissions each deriving motion from the prime mover and coördinating with these transmissions and trip mechanism automatically shifted or otherwise actuated by operating elements or dogs mounted on the table, so as to establish a driving connection between the feed screw and either one or the other of these transmissions. Furthermore the foregoing table-propelling mechanism will be coördinated with an instrumentality for enabling the direction of travel to be reversed whenever desired, and also with means instrumental in enabling the speed of the table feed to be varied by appreciable percentage increments, without, however, necessitating corresponding speed increments to be introduced into the quick traverse of the table.

The screw-propelling element G here assumes the form of a shifting clutch member, which is keyed to the screw, so that whenever this element G is rotated the screw will of necessity also be rotated and in a direction corresponding with that of said element. In the construction here shown, this element is splined to the screw through the intermediary of a sleeve or bushing 4, which is directly splined to the screw, but this is a mere detail of construction. This element is in the nature of a junction member in that it may be connected with one or the other of the two transmission lines, so as to convey the power of either to the lead-screw either directly or by means of intervening elements, as for example, the splined sleeve 4. In other words, the characteristic of the element G is that it is driven first rapidly by one transmission and then slowly by the other, and two clutches or motion interrupters at suitable points intervene between this element G and each of the two transmissions. The term "clutch" as hereinafter employed signifies any device for separating two adjacent power transmitters, so as to interrupt the transmitting capacity of the same.

The slow clutch S and fast clutch F in this embodiment of the invention each merely consists of opposing teeth projecting from an adjacent element, which are adapted to be intermeshed to establish a driving relation between such elements. In this instance, the member G carries teeth for the slow clutch S as well as for the fast clutch F. Thus, the terminal member 5 of the slow motion transmission carries teeth 6 forming features of the slow clutch, and the terminal member 7 of the fast motion transmission carries teeth 8, forming features of the fast clutch. In this instance, these transmission terminal members 5 and 7 assume the form of sleeves loosely circumscribing the feed-screw 1 and journaled in bearings 9 and 10 provided by the saddle C. The member 5 terminates in a bevel gear 11 which meshes with the slow motion transmission and the terminal member 7 terminates in a pinion 12 meshing with the fast motion transmission. A characteristic of this invention is that the clutches S and F are mutually so organized or related that the releasing of the one is concomitant with the engagement of the other, so that they function alternately and not simultaneously to transmit motion. By arranging these clutches S and F in opposite relations to the same member, their alternate operation may be performed by a simpler organization than otherwise; thus, to render either the clutch S or the clutch F operative with relation to the terminal drivers 5 and 7, it only becomes necessary to reciprocate the member G from one side to the other, and therefore a simpler construction of this general characteristic is preferred. This transmission may now be described.

The fast motion transmission H is power-driven and receives its motion in any suitable way from the prime mover E which is here instanced as a pulley. Conveniently this transmission may consist of a bracket 13 mounted on the column A, and in which is journaled a shaft 14 driven by means of a pulley 15 and a belt 16 that leads to the main pulley of the machine or to the counter-shaft or the like. A reverse box 17 is suspended from the saddle C and journals a shaft 18 which is connected with the shaft 14 by means of an extensible universal shaft 19. The shaft 18 in this instance then transmits motion through a reverse mechanism consisting of a clutch member 20 and two bevels 21 and 22, either of which may be locked to the shaft 18 by the operation of the clutch member 20, and each of which meshes with a bevel 23 which carries a gear 24 in mesh with an idler 25 that in turn drives a pinion 26 meshing with the terminal gear 12. By this means the terminal portion is driven at a relatively high rate of speed by power derived from the prime mover, this rate of speed representing a quick traverse of the table, i. e. as rapid a movement of the table as may be practical consistent with a smooth running of the machine. This quick traverse may be regarded in a practical sense as the maximum table speed, and it is desirable that this fast rate be a constant for the sake of efficiency, regardless of the extent to which the slow speed or "feed" of the table may be varied to meet working conditions. The slow motion transmission J essentially embodies also a speed change box K whereby its transmitting ratios, while always much slower than that of the fast motion transmission H, will be subject to considerable proportionate variations representing ultimately in the table travel motions corresponding with the feed appropriate for the work of a cutting tool under various conditions. This transmission is merely typical of any one of conventional constructions now in current use, as this transmission is merely used as an element of my new combination, and its specific form is immaterial to that combination. As here instanced, motion flows from the pulley E through the speed change box K, from which it is taken by the telescopic shaft 27 and is conveyed to the shaft 28, entering the reverse box Rs, signifying reverse slow, which is mutual with the reverse box Rf of the quick traverse motion. This reverse box is of a construction shown by Figs. 8, 9 and 10, and it comprises a shifting clutch member 29 adapted to connect either gears 30 or 31 with the shaft 32, so that such gears may be effective to rotate the shaft 32 which is ultimately geared to the shaft 33 mounted in the knee B. Gear 30 meshes with a gear 81 keyed directly to shaft 28, while gear 31 is driven by gear 80 through the intermediate gear 79, so that gears 30 and 31 will rotate in opposite directions. By operating member 29 to one or the other of its positions, the motion of the shaft 33 will be reversed, and by means of the vertical shaft 34 the terminal member 11 of the slow motion transmission will be rotated at a rate depending upon the feed desired.

From the foregoing it will be understood that by operating both of the reversers Rs and Rf the table will be caused to travel (at either a fast or a slow rate depending on the position of G) in either an advance or return direction, and by operating the clutches S and F the rate of travel of the table may be changed to correspond with either a "feed" movement or a "quick traverse" movement. The means for automatically enabling this to be done will now be described.

The automatic feed and quick traverse control comprises a trip element L which here assumes the form of a plunger movably mounted on the saddle and adapted to be moved into one or the other of its positions by means of dogs 35 and 36. This may be accomplished in a very simple manner by a part 37 connected with the member L and preferably constituting a head therefor, which part 37 provides a cam surface 38 adapted to be contacted by dog 35 and another cam surface 39 adapted to be contacted by dog 36. This plunger is provided with annular threads 40 which form a cylindrical rack in mesh with a pinion 41 that has a limited rotary play on the shaft 42 which is provided by means of a collar 43 keyed to the shaft 42 providing a circumferential slot 44 in which plays a pin 45 projecting from the pinion 41. This constitutes a lost motion instrumentality so that there may be some play of the parts, thus preventing any damage due to the positive actuation of the plunger L by the dogs on the table, while yet effecting a positive throw of the member G. The shaft 42 terminates in a part 46 riding in a groove in the member G and determining its position. As will be perceived, when the dogs act on the head of the plunger L they will shift the member G and cause either a feed or a quick traverse of the table automatically, depending upon which dog operates. These dogs are of complementary construction so that one raises the plunger and the other lowers it.

Referring to Fig. 5, it will be observed that when the clutch element G is midway between the parts 6 and 8, it will be free from each of these parts, so that the feed-screw cannot be rotated from either the fastmotion or from the slow-motion transmission. This position may be maintained by means of a spring-pressed wedge or pawl 73 (Fig. 11) which terminates in a V-shaped end 74, the tip or apex of which is adapted to seat in the small notch 75 in the extension or shank of the gear 41, and thus hold the same in this neutral position. It will be apparent that, by raising or lowering the plunger L exactly to the proper level (which will be done by having a suitably proportioned dog such as 66 Fig. 2 impact the head 63), the apex of the spring-pressed plunger 73 will be seated in this notch. On the other hand, if the gear 41 be rotated clockwise until the apex of the pawl 74 passes out of the notch 75 and takes a position on the sloping side of the major notch 76, then the pawl will continue the rotation by the force of its spring. This partial elevation of the plunger L is produced by a dog such as 64 impacting an under-surface of the head 63, and the positive partial uprise of the plunger L will now be impositively completed by the spring 77 which will force the pawl 74 toward the bottom of the major notch 76, thus causing the gear 41 to swing farther clockwise, so as to compel the teeth of the clutch member G to engage those of the member on one side of it. Conversely, the plunger L may be initially depressed by another dog of the type 65 so as to move the gear 41 anti-clockwise, and throw the pawl 74 on the other side of the notch 75, thus enabling it to be spring-pressed into the bottom of the other major notch 78, thereby throwing the clutch member G into its other position. In this way the feed screw may be rotated at either a fast or slow rate depending upon whether the plunger L is in its elevated or depressed position, or by utilizing a dog of the type illustrated by 66, the plunger L may be brought to its exact normal or midway position, and rotation of the feed screw will thus be discontinued.

The automatic reverse mechanism for the feed and quick traverse as proposed by this invention enables the table to reverse its direction automatically at any station of its travel and to return either rapidly or slowly and either continuously or by any desired sequence of feeds and traverses. More often, however, it will be desired to have the return be continuous and rapid, in which event the reverse mechanism will be thrown either immediately before or after the propelling mechanism is set for "feed" or "quick traverse," and to prevent disturbing this setting during the return stroke, the dogs 35 and 36 will be pivoted latch-wise so that they may ineffectively pass the trip member L.

A trip element 47 constitutes a means instrumental in reversing the direction of the quick traverse movement, and in this instance, this element is in the form of a rock shaft carrying a short pin 48 and a long pin 49, adapted to be actuated by dogs 50 and 51 traveling with the table. The dog 51 provides an operating cam surface adapted to coact with the pin 49, or at such an elevation with respect to the pin 48 that it may clear the same, so that no interference will take place during the return stroke. The shank 52 of this trip element 47 is journaled in a bracket 53 and at its lower end carries a pinion 54 that meshes with rack-teeth in a block 55, the ultimate position of which is controlled by a spring-pressed wedge 56 that is adapted to seat on one side or the other, or on the tip of a wedge-shaped projection 57 of the block 55. To enable these parts to retain their position tip to tip, the tip of one will be slightly notched or recessed (in the way shown by Fig. 11) to hold the neutral position, which will correspond with an interruption of the driving capacity of the transmission, and result in stopping the travel of the table when this transmission is otherwise operative. It is to be understood that the operating dog for the element 47 will be constructed to throw the same only into neutral position in case such dog is desired to effect a stopping of the machine, and to that end the dog may be constructed with a secondary abutment that will limit the re-active movement of the trip element 47. For other positions, the wedge 56 will be on one or the other slope of the projection 57 and thus effective to move the block 55. The block 55 is slidably mounted on a sliding shaft 58 between shoulders 59 and 60 thereof, providing some play between the parts to prevent a positive throw when the teeth of the actuated clutch are not in intermesh position, and to enable the spring plunger 56 to complete the throw as soon as such position is attained. This shaft 58 carries a finger 61 that controls the position of the clutch member 20, bringing it either into engagement with one or the other of the bevels 21 or 22 to effect a reversal of the drive, or into intermediate neutral position to effect a stop, as the case may be.

*Intermittent milling with quick full stroke return.*—This is readily accomplished by the mechanism thus far described, and without necessitating the use of a reverse in the slow speed or "feed" transmission. Assuming that the slow speed transmission always propels the table to the left and that the trip element 47 is in a position causing the quick traverse transmission also to move the table to the left, the action will be as follows: First the table will move rapidly until dog 35 encounters plunger L, which will then be moved to connect the slow transmission and the table will then be moved slowly until dog 36 is encountered and the fast transmission thrown into action, and so on, until dog 51 impacts the pin 49 and throws the trip element into position reversing the effect of the fast transmission (which is then in operation) and the table will be quickly returned until dog 50 impacts the pin 48 of the trip element 47 and moves the latter either into neutral position to effect a stop, or into its other extreme position to effect a quick forward movement again, as may be desired.

For certain classes of work, it is desired to have a slow movement of the table take place, on its return stroke as well as its forward stroke, and this may be accomplished by means of the mechanism for reversing the direction of drive of the slow motion transmission. This is accomplished by a trip element 62 (Fig. 2) having a double cammed head 63 adapted to be moved up or down by dogs 64 and 65, or into its neutral intermediate position by dog 66. This trip element rocks a shaft 71 that extends horizontally through the saddle and, through the plunger 12 (Fig. 10) operates the rock shaft 67 that carries a pinion 68 meshing with a segment 69 which controls the clutch member 29, and which is in turn controlled by the spring-pressed plunger 70 in a manner similar to that described in connection with the other trip mechanism. Thus, the plunger 70 of Fig. 8 has a notch 82 in its end which engages the apex 83 of the segment 69 and is enabled when thus set to hold the clutch 29 in inoperative or neutral position. When the apex 83 is shifted out of the notch 82, however, the plunger 70 will act on the bevel and cause the segment to swing either to right or to left, as the case may be, and thus cause shaft 32 to be rotated clockwise or anti-clockwise.

Fig. 12 represents a modification of the spring-pressed plunger in which the neutral notch is dispensed with so that in this instance there will be no prolonged interruption of the drive, and the drive will be either direct or reverse.

Continuous milling may be performed as follows: Assume the parts to be in such position that the table is traveling rapidly to the right. At the middle of its stroke the plunger L will be moved into its slow position and the table will then move slowly toward the end of its stroke, and during this half-stroke a dog will move the trip element 47 into reverse position, (which will not as yet affect the table) and at the end of its stroke, a dog will move the trip element L into its fast position whereupon the table will move rapidly to the left, and during this half-stroke a dog will move the trip element 62 into its reverse position (which will not as yet affect the table) and at the middle of its stroke a dog will return the trip element L to its slow position, whereupon the table will move slowly to the left, and during this slow half-stroke a dog will trip the element 47 to its forward position (which will not as yet affect the table), and at the end of its left stroke a dog will trip the element L into its fast position, and this cycle will be repeated. From this it will be seen that by means of the foregoing mechanism almost any desired movement of the table may be effected with respect to changing from a feed to a quick-traverse either on a forward or on a return stroke of the table. The means whereby the different feeds will be available without disturbing the rate of quick traverse will now be described.

The speed change mechanism in the slow motion transmission merely consists of a conventional speed change box K, but an essential characteristic of this invention resides in the relation between this box and the operating or transmitting mechanism. That is to say, it is to be noted that this speed change box is located so that it affects only the slow motion transmission and is ineffective to introduce speed variations into the quick motion transmission. This relation or combination is important and of great utility by reason of the fact that it enables the feeding rate to be changed to any extent desired while at the same time permitting the quick traverse rate to be maintained constant, in other words, always at the maximum rate so that the greatest amount of time will always be saved by its operation.

Having thus revealed this invention, I claim as new and desire to secure by Letters Patent of the United States:—

1. A mechanism for automatically alternating a feed and a quick traverse combining a table, a feed screw translating with the table and rotatably mounted thereon, a saddle slidably supporting said table, a fixed nut circumscribing said feed screw and supported by said saddle, a prime mover, a transmission extending therefrom and embodying a feed change mechanism, a second transmission extending from said prime mover, clutch mechanism enabling said first transmission to be connected with said feed screw to rotate the same slowly to feed said table, said clutch mechanism being adapted to connect said second transmission with said feed screw to rotate it rapidly and effect a quick traverse of said table, and a plurality of dogs adjustably secured to said table and effective to actuate said clutch mechanism into one or the other of its effective positions.

2. A mechanism for automatically alternating a feed and a quick traverse combining a table, a feed screw translating with the table and rotatably mounted thereon, a saddle slidably supporting said table, a fixed nut circumscribing said feed screw and supported by said saddle, a prime mover, two transmissions extending therefrom in parallel series, the one embodying a speed change mechanism and transmitting a feeding motion, and the other transmitting a quick traverse motion, a clutch mechanism effective in one position operatively to connect the feed motion transmission with said screw, and in its other position effective operatively to connect the quick traverse transmission with said screw, and a plurality of dogs adjustably secured on said table adapted to shift said mechanism from the one to the other of its said positions.

3. A mechanism for automatically alternating a feed and a quick traverse combining a table, a feed screw translating with the table and rotatably mounted thereon, a saddle slidably supporting said table, a fixed nut circumscribing said feed screw and supported by said saddle, a prime mover, a first sleeve and a second sleeve each journaled in said saddle and loosely circumscribing said feed screw, a first transmission enabling said prime mover slowly to rotate said first sleeve, a speed change mechanism in said transmission to vary the rate of rotation, a second transmission enabling said prime mover rapidly to rotate said second sleeve, a clutch adapted in one position operatively to connect said first sleeve with said screw and in another position operatively to connect said second sleeve with said screw, trip mechanism for shifting said clutch, and a dog adjustably mounted on said table to actuate said trip mechanism.

4. A mechanism for automatically alternating a feed and a quick traverse combining a table, a feed screw translating with the table and rotatably mounted thereon, a saddle slidably supporting said table, a fixed nut circumscribing said feed screw and supported by said saddle, a prime mover, a sleeve journaled on said saddle and loosely circumscribing said feed screw, a transmission extending from said prime mover and comprising a speed change mechanism and a vertical shaft having its upper end geared to said sleeve to enable it to be slowly rotated by said prime mover, a second transmission extending from said prime mover adapted to transmit a quick traverse motion, clutch mechanism for rendering either of said transmissions effective to rotate said feed screw, and a dog adjustably mounted on said table adapted to actuate said clutch mechanism.

5. A mechanism for automatically alternating a feed and a quick traverse combining a table, a feed screw translating with the table and rotatably mounted thereon, a saddle slidably supporting said table, a fixed nut circumscribing said feed screw and supported by said saddle, a prime mover, mechanism for rotating said feed screw, two branch-line transmissions extending from said prime mover to said mechanism, the one comprising a speed change mechanism and adapted to transmit power for feeding said table, and the other being adapted to transmit power for effecting a quick traverse of said table, trip mechanism for interchangeably rendering the one or the other of said transmissions effective to rotate said feed screw, and a dog adjustably mounted on said table adapted to actuate said trip mechanism.

6. A mechanism for automatically alternating a feed and a quick traverse combining a table, a feed screw translating with the table and rotatably mounted thereon, a saddle slidably supporting said table, a fixed nut circumscribing said feed screw and supported by said saddle, a prime mover, a first member and a second member, trip mechanism for operatively connecting either of said members with said feed screw, a dog adjustably mounted on said table adapted to actuate said trip mechanism, a transmission extending from said prime mover and comprising a feed change mechanism adapted slowly to rotate said first member, and a second transmission extending from said prime mover adapted rapidly to rotate said second member.

7. A mechanism for automatically alternating a feed and a quick traverse combining a table, a feed screw translating with the table and rotatably mounted thereon, a saddle slidably supporting said table, a fixed nut circumscribing said feed screw and supported by said saddle, a prime mover, a first member and a second member, trip mechanism for operatively connecting either of said members with said feed screw, a dog adjustably mounted on said table adapted to actuate said trip mechanism, a transmission extending from said prime mover and comprising a feed change mechanism adapted slowly to rotate said first member, and a second transmission extending from said prime mover adapted rapidly to rotate said second member, and clutch mechanism in said second transmission adapted to reverse the driving relation thereof.

8. A mechanism for automatically alternating a feed and a quick traverse combining a table, a feed screw, a part in splined relation with the feed screw, a first gear adapted to be engaged with said part to actuate it, a power driven transmission embodying a speed change mechanism for driving said first gear, a second gear adapted to be engaged with said part to rotate it, a second power driven transmission adapted to drive said gear at a rate such that it will rotate said part more rapidly than said part will be rotated by said first gear, shifting mechanism operative in one position to effect an engagement between said first gear and said part, and in another position to effect an engagement between said second gear and said part, and dogs adjustably secured to said table for throwing said shifting mechanism into its one or its other position automatically at predetermined stations in the travel of the table.

9. A mechanism for automatically alternating a feed and a quick traverse combining a table, a feed screw, a part in splined relation with said feed screw, two separate transmissions extending from a prime mover and each terminating in proximity with said part, a shifting mechanism for connecting the one or the other transmission with said part to rotate said screw rapidly or slowly, trip mechanism actuated by dogs on said table to operate said shifting mechanism automatically, a reverse device in the fast driving transmission, and a second trip mechanism actuated by dogs on said table adapted to operate said reverse device to reverse the direction of drive of its transmission.

10. A mechanism for automatically alternating a feed and a quick traverse combining a table, a feed screw, a part in splined relation with said feed screw, two transmissions each terminating adjacent said part and both being power driven, the one slowly and the other rapidly, said slow motion transmission embodying a speed change mechanism, and said fast motion transmission embodying a reverse device, and shifting mechanism for connecting the one or the other transmission with said part, a dog on said table adapted to throw said shift mechanism, and trip mechanism operated by said table to actuate said reverse device.

11. A mechanism for automatically alternating a feed and a quick traverse combining a table, a table feed-screw, a continuously-driven slow-running gear-sleeve loosely circumscribing said screw, a power-driven transmission embodying a speed-change mechanism for slowly rotating said sleeve, a fast-running gear mounted on said screw, a power-driven transmission therefor, clutch mechanism for first rendering said gear inoperative positively to rotate said screw and then establishing a positive driving relation between said gear-sleeve and said screw, shift mechanism for operating said clutch mechanism, and a dog adjustably secured to said table adapted automatically to actuate said shift-mechanism at a predetermined station, whereby the travel of said table will be automatically changed from a feed to a quick-traverse motion.

12. A mechanism for automatically alternating a feed and a quick traverse combining a table; a feed-screw; a first member loosely circumscribing said screw and at one end providing clutch teeth; a second member mounted on said screw and having clutch teeth on its end adjacent said first member; one of said members being axially movable to bring its teeth into engagement with the other and one of said members being in splined relation with said screw; a shift mechanism for effecting a relative movement between said members to engage said teeth together; two power-driven transmissions, one of which comprises a speed change mechanism; one of said transmissions being geared to said first member, means enabling the other transmission to be operatively connected with said second member, and automatic trip-mechanism for operating said shift mechanism and said means by the travel of the table.

13. A mechanism for automatically alternating a feed and a quick traverse combining a table, a table feed-screw, a continuously driven slow-running gear-sleeve loosely circumscribing said screw, a power-driven transmission for slowly rotating said sleeve embodying a reverse device and a speed-change mechanism, a fast-running gear mounted on said screw, a power-driven transmission therefor embodying a reverse device, clutch mechanism for first rendering said gear inoperative positively to rotate said screw and then establishing a positive driving relation between said gear-sleeve and said screw, shift mechanism for operating said clutch mechanism, a dog adjustably secured to said table adapted automatically to actuate said shift mechanism at a predetermined station, whereby the travel of said table will be automatically changed from a feed to a quick-traverse motion, and table-actuated trip-mechanism for automatically operating both of said reverse-devices.

14. A mechanism for automatically alternating a feed and a quick traverse combining a table, a feed-screw, a first member loosely circumscribing said screw and at one end providing clutch teeth, a second member mounted on said screw and having clutch teeth on its end adjacent said first member, one of said members being axially movable to bring its teeth into engagement with the other and one of said members being in splined relation with said screw, a shift mechanism for effecting a relative movement between said members to engage said teeth together, two power-driven transmissions each of which comprises a reverse device and one of which comprises a speed-change mechanism, one of said transmissions being geared to said first member, means enabling the other transmission to be operatively connected with said second member, and adjustable automatic trip mechanisms for operating said shift mechanism, said reverse-devices and said means at predetermined stations in the travel of the table.

15. A mechanism for automatically alternating a feed and a quick traverse combining a table, a table feed-screw, a continuously driven slow-running gear-sleeve loosely circumscribing said screw, a power-driven transmission for slowly rotating said sleeve embodying a speed change mechanism and a reverse device, a fast-running gear mounted on said screw, a power-driven transmission therefor, clutch mechanism for first rendering said gear inoperative positively to rotate said screw and then establishing a positive driving relation between said gear-sleeve and said screw, shift mechanism for operating said clutch mechanism, a dog adjustably secured to said table adapted automatically to actuate said shift mechanism at a predetermined station, whereby the travel of said table will be automatically changed from a feed to a quick-traverse motion, and a table-actuated trip mechanism for operating said reverse device.

16. A mechanism for automatically alternating a feed and a quick traverse combining a table, a feed-screw, a first member loosely circumscribing said screw and at one end providing clutch teeth, a second member mounted on said screw and having clutch teeth on its end adjacent said first member, one of said members being axially movable to bring its teeth into engagement with the other and one of said members being in splined relation with said screw, a shift mechanism for effecting a relative movement between said members to engage said teeth together, two power-driven transmissions one of which comprises a reverse device and a speed change mechanism, one of said transmissions being geared to said first member, means enabling the other transmission to be operatively connected with said second member, and automatic trip mechanisms for operating said shift mechanism, said means, and said reverse device at predetermined stations in the travel of the table.

17. A mechanism for automatically alternating a feed and a quick-traverse combining a table, a feed-screw translating with the table and rotatably mounted thereon, a saddle slidably supporting said table, a fixed nut circumscribing said feed screw and supported by said saddle, a prime mover, a transmission extending therefrom and embodying a reverse device and a feed-change mechanism, a second transmission extending from said prime mover, clutch mechanism enabling said first transmission to be connected with said feed-screw to rotate the same slowly to feed said table, said clutch mechanism being adapted to connect said second transmission with said feed-screw to rotate it rapidly and effect a quick traverse of said table, means for operating said reverse device, and a plurality of dogs adjustably secured to said table and effective to actuate said clutch mechanism and said reverse device into one or the other of their effective positions.

18. A mechanism for automatically alternating a feed and a quick-traverse combining a table, a feed-screw translating with the table and rotatably mounted thereon, a saddle slidably supporting said table, a fixed nut circumscribing said feed screw and supported by said saddle, a prime-mover, two transmissions extending therefrom in parallel series, the one embodying a reverse device and a speed-change mechanism and transmitting a feeding motion, and the other transmitting a quick-traverse motion, a clutch mechanism effective in one position operatively to connect the feed-motion transmission with said screw, and in its other position effective operatively to connect the quick traverse transmission with said screw, and a plurality of dogs adjustably secured on said table adapted to shift said clutch mechanism and said reverse device from the one to the other of their operative positions.

19. A mechanism for automatically alternating a feed and a quick traverse combining a table, a feed-screw translating with the table and rotatably mounted thereon, a saddle slidably supporting said table, a fixed-nut circumscribing said feed screw and supported by said saddle, a prime-mover, a first sleeve and a second sleeve each journaled in said saddle and loosely circumscribing said feed-screw, a first transmission enabling said prime-mover slowly to rotate said first sleeve, a speed-change mechanism and a reverse device in said transmission to vary the rate and direction of rotation, a second transmission enabling said prime-mover rapidly to rotate said second sleeve, a clutch adapted in one position operatively to connect said first sleeve with said screw and in another position operatively to connect said second sleeve with said screw, trip mechanisms for shifting said clutch and said reverse device, and dogs adjustably mounted on said table to actuate said trip mechanisms.

20. A mechanism for automatically alternating a feed and a quick traverse combining a table, a feed-screw translating with the table and rotatably mounted thereon, a saddle slidably supporting said table, a fixed nut circumscribing said feed screw and supported by said saddle, a prime-mover, a sleeve journaled on said saddle and loosely circumscribing said feed screw, a transmission extending from said prime-mover and comprising a reverse device and a speed change mechanism and terminating in a vertical shaft having a bevel gear at its upper end geared to said sleeve to enable it to be slowly rotated by said prime mover, a second transmission extending from said prime-mover adapted to transmit a quick-traverse motion, clutch mechanism for rendering either of said transmissions effective to rotate said feed screw, and trip elements adjustably mounted on said table adapted to actuate said clutch mechanism and said reverse device.

21. A mechanism for automatically alternating a feed and a quick-traverse combining a table, a feed-screw translating with the table and rotatably mounted thereon, a saddle slidably supporting said table, a fixed nut circumscribing said feed screw and supported by said saddle, a prime mover, mechanism for rotating said feed-screw, two branch-line transmissions extending from said prime-mover to said mechanism, the one comprising a speed change mechanism and adapted to transmit power for feeding said table, and the other comprising a reverse mechanism and being adapted to transmit power for effecting a quick-traverse of said table, trip mechanisms for operating said reverse mechanism and for interchangeably rendering the one or the other of said transmissions effective to rotate said feed screw, and dogs adjustably mounted on said table adapted to actuate said trip mechanisms.

22. A mechanism for automatically alternating a feed and a quick-traverse combining a table, a feed-screw translating with the table and rotatably mounted thereon, a saddle slidably supporting said table, a fixed nut circumscribing said feed screw and supported by said saddle, a prime-mover, a first member and a second member, trip mechanism for operatively connecting either of said members with said feed screw, a dog adjustably mounted on said table adapted to actuate said trip mechanism, a transmission extending from said prime-mover and comprising a reverse device and a feed-change mechanism adapted slowly to rotate said first member, a second transmission comprising a reverse device and extending from said prime mover adapted rapidly to rotate said second member, and dogs on said table adapted to actuate each of said reverse devices.

23. A mechanism for automatically alternating a feed and a quick-traverse combining a table, a feed-screw translating with the table and rotatably mounted thereon, a saddle slidably supporting said table, a fixed nut circumscribing said feed screw and supported by said saddle, a prime-mover, a first member and a second member, trip mechanism for operatively connecting either of said members with said feed screw, a dog adjustably mounted on said table adapted to actuate said trip mechanism, a transmission extending from said prime-mover and comprising a feed change mechanism adapted slowly to rotate said first member, a second transmission extending from said prime mover adapted rapidly to rotate said second member, clutch mechanism adapted to reverse the driving relations of said transmissions and said screw, and trip elements carried by said table to actuate said clutch mechanism.

24. A mechanism for automatically alternating a feed and a quick traverse combining a main frame, a main pulley and a secondary pulley independently mounted on said frame, and both adapted to be power driven, a table, a slow motion transmission extending from said main pulley to said table, a fast motion transmission extending from said auxiliary pulley to said table, a lever in each transmission for reversing the driving direction of its transmission, and table-operated automatic means for interchangeably establishing an operative propelling connection between either of said transmissions and said table.

25. A mechanism for automatically alternating a feed and a quick traverse combining a table, a feed screw for reciprocating said table, a sleeve loosely circumscribing said feed screw, a slow motion power transmission for continuously rotating said sleeve, a member splined to said feed screw and having clutch teeth adapted to engage with said sleeve to transmit motion from it to said screw, an auxiliary fast driving power transmission, and a table-operated lever for automatically establishing connection between the same and said splined member whereby said feed screw may be rapidly rotated independently of said sleeve.

In witness whereof, I hereunto subscribe my name, as attested by the two subscribing witnesses.

SOL EINSTEIN.

Witnesses:
 ALBERT F. NATHAN,
 OLIVER B. KAISER.